United States Patent

[11] 3,583,761

| [72] | Inventors | Clayton R. Hume<br>Louisville, Ky.;<br>David S. Garceau, Columbus, Ind. |
|---|---|---|
| [21] | Appl. No. | 829,460 |
| [22] | Filed | Jan. 2, 1969 |
| [45] | Patented | June 8, 1971 |
| [73] | Assignee | Hamilton Cosco, Inc.<br>Columbus, Ind. |

[54] CHILD'S AUTOMOBILE SEAT
6 Claims, 6 Drawing Figs.

[52] U.S. Cl. ............................................. 297/253,
297/256, 297/389
[51] Int. Cl. ....................................................... A47d 1/10
[50] Field of Search............................................ 297/253,
250, 254, 256, 389, 385

[56] References Cited
UNITED STATES PATENTS

| 2,576,867 | 11/1951 | Wilson | 297/389 |
| 2,997,341 | 8/1961 | Borgia | 297/385 |
| 3,043,625 | 7/1962 | Bohlin | 297/389 |
| 3,113,802 | 12/1963 | Goldsholl | 297/59 |
| 3,227,490 | 1/1966 | Svensson | 297/389 |
| 3,243,233 | 3/1966 | Davis | 297/389 |
| 3,262,736 | 7/1966 | Merelis | 297/253 |
| 3,305,265 | 2/1967 | Linden | 297/253 |
| 3,338,631 | 8/1967 | Smith et al. | 297/256 |

*Primary Examiner*—Francis K. Zugel
*Attorney*—Trask, Jenkins & Hanley

ABSTRACT: A foldable infant's automobile seat in which there is a supporting base adapted to be supported on an automobile seat cushion and provided with an upwardly extending seat-supporting member. A back frame provided with a backrest is swingably connected to said base for movement between a retracted position in which it is generally parallel with the base and an extended position generally perpendicular to said base in which it is adapted to be supported against the automobile seat back cushion. A seat is swingably connected to said back frame for movement between a retracted position generally parallel with the backrest and an extended position generally perpendicular to said backrest in which it is supported upon the seat-supporting member of the base. A guardrail is also swingably connected to the back frame for movement between an extended position generally perpendicular to said backrest and a retracted position generally parallel with said backrest.

INVENTORS
CLAYTON R. HUME
DAVID S. GARCEAU
BY

ATTORNEYS

INVENTORS
CLAYTON R. HUME
DAVID S. GARCEAU
BY
ATTORNEYS

CHILD'S AUTOMOBILE SEAT

SUMMARY OF THE INVENTION

In accordance with the preferred form of the invention, there is provided a base frame having a pair of laterally spaced runners adapted to rest on the seat cushion of an automobile seat and terminating at their forward ends in an upwardly projecting seat-supporting member. A back frame having a backrest mounted thereon is swingably connected to said runners adjacent the rear ends thereof. Said back frame has a pair of brackets mounted thereon adjacent the lower edge of said backrest, and a seat is swingably mounted on said brackets in position to engage the back frame and the seat-supporting member on the base so that said seat can be supported in an extended position on said back frame and member. Conveniently, said seat and seat-supporting member are provided with cooperative locking members for releasably locking the seat, and thus the back frame, in extended operative positions.

In order to retain a child in the seat, a generally U-shaped guardrail is swingably mounted on the back frame above the interconnection of said frame to the seat. Cooperative locking means are provided on said back frame and guardrail for releasably locking said guardrail in an extended operative position in which it projects forwardly from said back frame. Seat and shoulder-belt assemblies are connected to said back frame and brackets for further retaining an infant on said seat.

With the car seat in its fully extended operative position, the back frame projects upwardly from the base frame and the seat and guardrail project forwardly from said back frame, the locking members on the seat and seat-supporting member releasably retaining the back frame and seat in their extended positions. In order to collapse the car seat, the guardrail is swung over the top of the back frame into a retracted position, and the seat is unlocked from the supporting member and swung into a retracted position generally parallel with the back frame. With the seat being unlocked from its supporting member on the base frame, the back frame can be swung downwardly into its collapsed position generally parallel with the base frame, said back frame carrying the seat and guardrail with it during its collapsing movements.

BRIEF DESCRIPTION OF THE DRAWINGS

The accompanying drawings illustrate the invention. In such drawings.

DETAILED DESCRIPTION OF THE INVENTION

Figure 1:
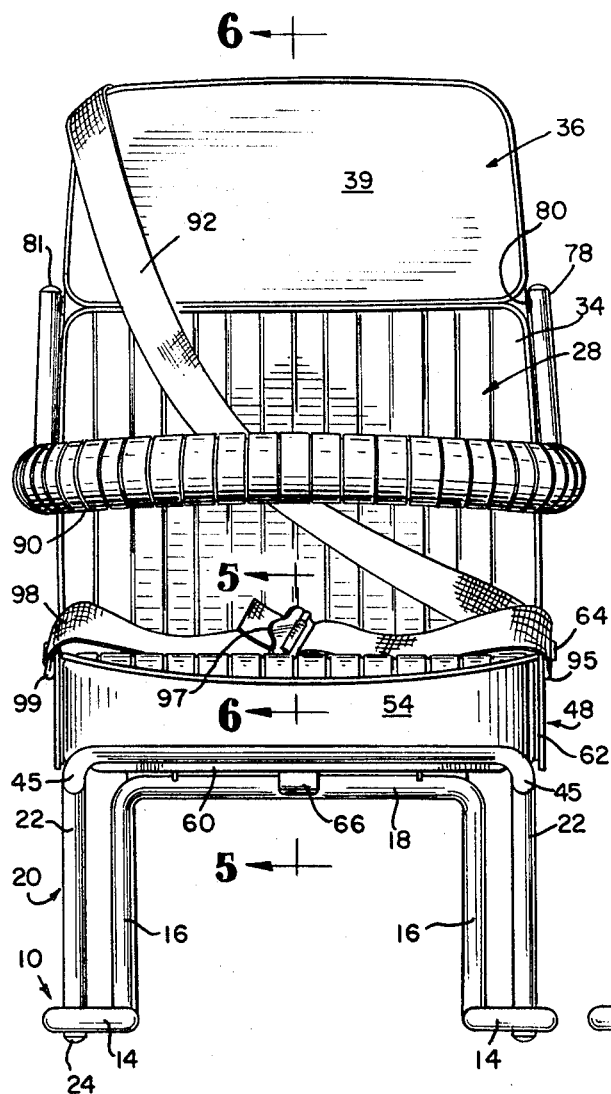
FIG. 1 is a front elevation of an infant's car seat embodying the invention.

As shown in the drawings, the car seat forming the instant invention is supported upon a base frame 10 conveniently formed from a length of metal tubing. Such frame comprises a pair of laterally spaced, generally parallel runners 12 having end caps 13 received in their open rearward ends. The forward ends of said runners terminate in inwardly directed stretches 14 whose inner ends terminate in a pair of upwardly and rearwardly angled parallel members 16. The upper ends of the members 16 are interconnected by a transverse bight 18. Thus, when the device is placed upon an automobile seat cushion, the runners 12, together with the forward base stretches 14, are supported upon said seat cushion, and if desired, the device can be positioned on such cushion in a manner such that the rear ends of the runners 12 project inwardly between said seat cushion and its associated backrest.

A back frame 20 is swingably connected to the base frame 10. Conveniently, said back frame is also formed from metal tubing and comprises a pair of generally parallel uprights 22 interconnected at their upper ends by a transverse bight 23 and closed at their lower end caps 24. As shown, the uprights 22 are swingably connected to the inner faces of the runners 12 adjacent the rear ends thereof by pivot pins 26 so that said back and base frames are movable with respect to each other about the transverse axis of said pins.

A backrest 28 is mounted on the uprights 22 in vertically spaced relation to the bight 23. As shown, said backrest comprises a rigid panel 30 secured to the uprights 22 by fasteners 32 and having its front face covered by a resilient pad 33, said pad and panel being encapsulated in a covering 34 extending therearound. A headrest 36 is also mounted on the uprights 22 above the backrest 28. Said headrest has the same construction as the backrest, and thus comprises a rigid panel 37 having a resilient pad 38 extending over its front face with said pad and panel being encapsulated in a flexible covering 39. The headrest is mounted on the uprights 22 by a pair of fasteners 40 extending through the uprights and received in openings 42 formed in the panel 37. In order to permit the headrest to be adjusted with respect to the height of the child using the car seat, the openings 42 comprise a plurality of pairs of vertically spaced, horizontally aligned openings formed in the panel 37 in which the fasteners 40 can be selectively received.

A seat is swingably interconnected to the back frame uprights 22, and comprises a U-shaped seat frame 43 formed from a length of metal tubing bent into a generally U-shape to provide a pair of lateral stretches 45 interconnected at their forward ends by a transverse bight 46. A seat cushion 48 having the same construction as the backrest and headrest 28 and 36 is mounted on the upper face of the seat frame. Said cushion comprises a rigid panel 50 connected to the seat frame by fasteners 52. A resilient pad 53 is supported on the panel 50, and said pad and panel are encapsulated in a covering 54.

In order to swingably mount the seat on the back frame, a pair of brackets are mounted on the uprights 22. Each of said uprights comprises a rear leg 56 mounted on the front face of one of the uprights and connected to a forwardly projecting leg 58. A downwardly open-channeled brace 60 extends transversely across the seat frame adjacent the rear thereof and is connected to the upper faces of the seat frame stretches 45. The ends of said brace terminate in rearwardly projecting feet 62 slidably carried against the inner faces of the bracket legs 58. The legs 58 and feet 62 are swingably interconnected by headed pivot pins 64 which define a transverse axis for swinging movement of the seat with respect to the back frame.

Figure 2:
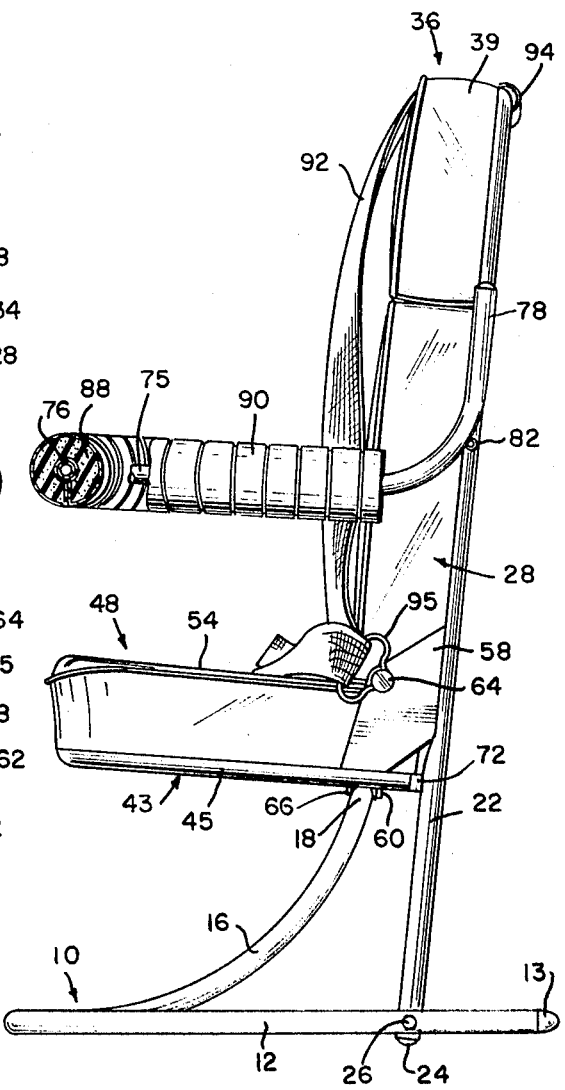
FIG. 2 is a side elevation of the car seat shown in FIG. 1, but with portions thereof being broken away.
Figure 3:
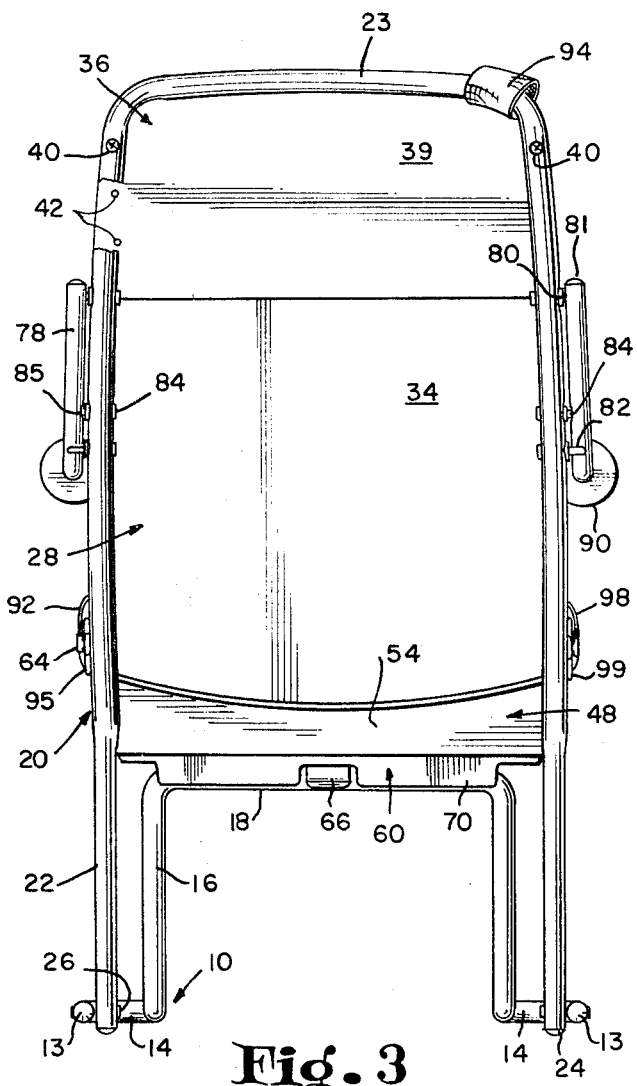
FIG. 3 is a rear elevation of the car seat shown in FIG. 1.

As shown in FIG. 2, a downwardly open U-shaped spring clip 66 is mounted on the brace 60, as by a rivet 67, and is adapted to be bindingly received over the bight 18 of the base frame for releasably retaining the seat in a horizontal operative position on said bight. Said seat is further supported in its operative position by an elongated downwardly projecting leg 70 along the rear edge of the brace 60 and engageable with the rear face of the base frame bight 18 and by concave plugs 72 received in the ends of the seat frame stretches 45 and bearing against the forward faces of the back frame uprights 22.

As shown, a U-shaped guardrail is swingably mounted on the back frame and comprises a length of tubing bent to provide a pair of lateral arms 75 interconnected at their forward ends by a transverse bight 76. The rear ends 78 of the arms 75 are bent upwardly and are swingably connected to the outer faces of the uprights 22 by pivot pins 80 defining a transverse swinging axis above the axis about which the seat is swingable. Desirably, the ends 78 are closed by end caps 81 inserted therein. Pins 82 project outwardly from the uprights 22 adjacent the bends in the rail ends 78 to abut the rear faces of the ends 78 and thus releasably support the rail in a generally horizontal operative position. A second pair of outwardly projecting pins 84 are disposed above the pins 82, but project a shorter distance outwardly from the uprights than the pins 82. Recesses 85 are formed in the inner faces of the rail ends 78 and are adapted to be received over the pins 82. Thus, as the guardrail is swung downwardly into its operative position, the pins 84 cam the ends 78 laterally outwardly until said ends are swung over the pins and said pins are received in the recesses 85. The inherent resiliency of the guardrail urges the ends 78 laterally inwardly for releasably retaining the pins 84 in the recesses 85.

Desirably, a U-shaped sleeve 88 formed of a resilient material is received around the guardrail arms 75 and bight 76. Said sleeve is encapsulated within a flexible covering 90.

As shown in FIG. 1, 24 shoulder strap 92 is mounted on the back frame bight 23 by a loop 94 formed in one end of said strap and received around said bight. The strap 92 extends downwardly from the bight 23 and is slidably received in a loop 95 removably and swingably mounted on one of the pivot pins 64, said loop being removably retained between the head of the pin 64 and the outer face of the adjacent bracket leg 58. The end of the strap 92 extending through the loop 95 has a buckle 97 mounted thereon. Said buckle is adapted to adjustably receive one end of a second strap 98. The opposite end of the strap 98 is connected to a second loop 99 removably and swingably mounted on the other pivot pin 64 between the head of said pin and the outer face of the adjacent bracket leg 56. Thus, the straps 92 and 98 act in combination with each other to provide both a shoulder and seatbelt strap assembly for securely retaining a child in the seat.

With the sea and back frames in their erected positions shown in FIG. 1, the rearward ends of the base frame runners 12 can be inserted between the seat and backrest on the automobile seat until the back frame 20 abuts the automobile seat cushion. A conventional automobile seatbelt can then be fastened in front of the back frame uprights 22 or the base frame members 16 for securely mounting the car seat in position on the automobile seat. The guardrail, whose arms 75 are longer than the distance between the back frame bight 23 and the pins 80, is then swung upwardly about the axis of its pins 80 and the loop 95 is removed from its associated pivot pin 64. An infant can then be placed on the seat cushion 48, and the loop 95 repositioned over its pin 64 to thus dispose the seat- and shoulder-belt assemblies in operative position across the child. It is to be understood, of course, that said seatbelt and shoulder-belt assemblies can be adjusted by proper positioning of the strap 98 in the buckle 97. The guardrail is then swung downwardly and retained in its operative position by the pins 82 and 84.

Figure 4:
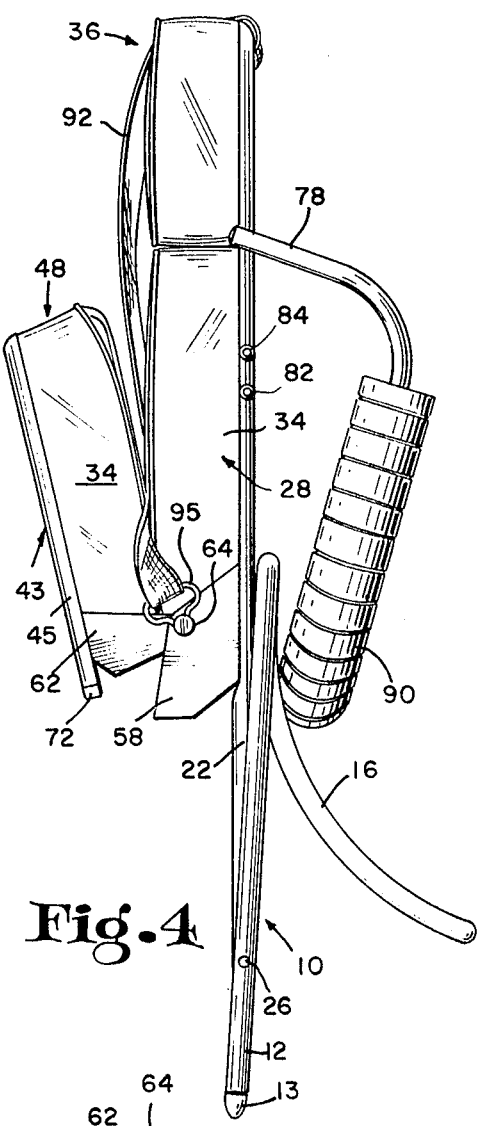
FIG. 4 is a side elevation similar to FIG. 2, but showing the car seat in its folded retracted position.
Figure 5:
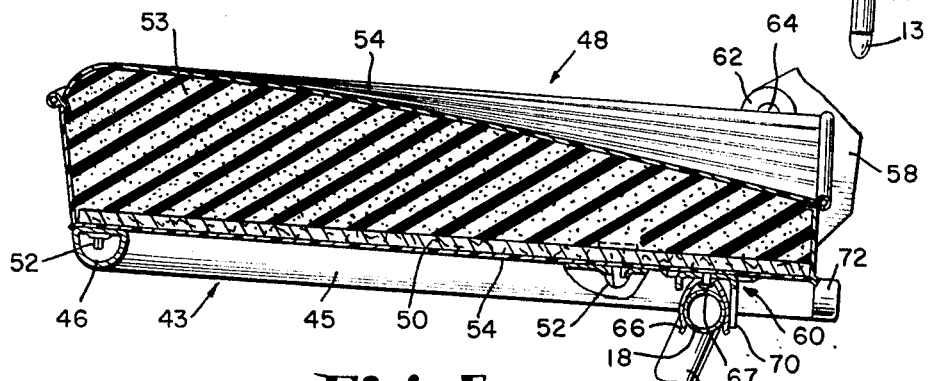
FIG. 5 is an enlarged fragmentary vertical section taken on the line 5-5 of FIG. 1.
Figure 6:
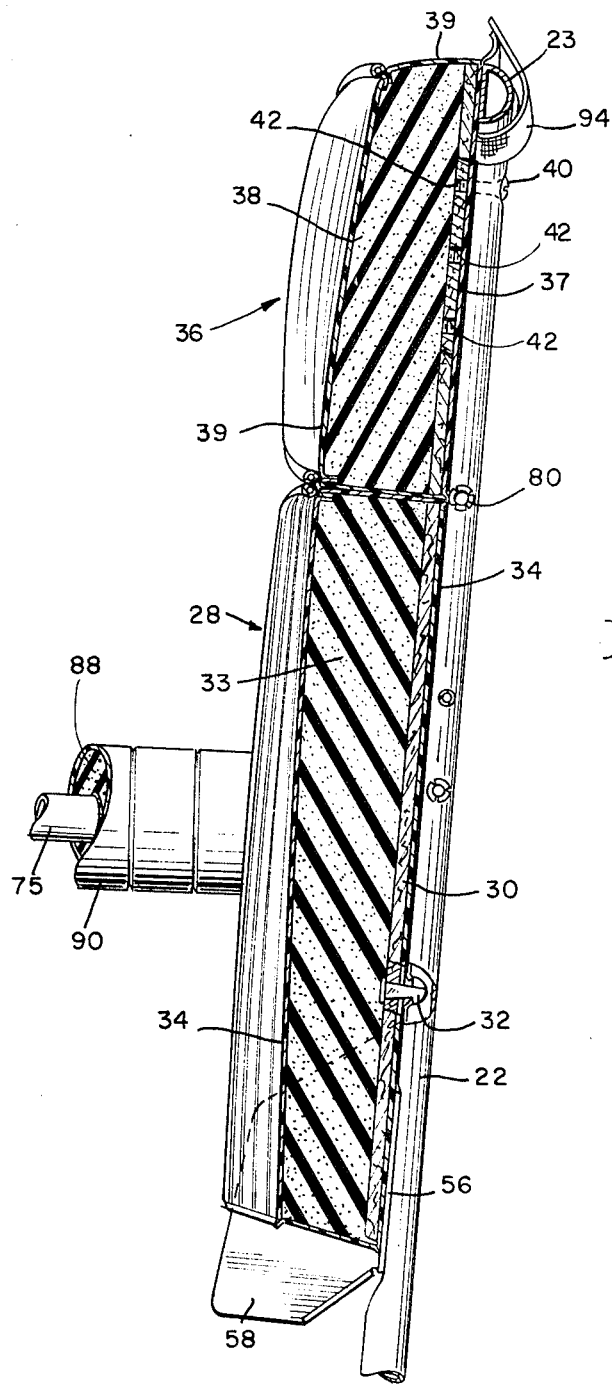
FIG. 6 is an enlarged fragmentary vertical section taken on the line 6-6 of FIG. 1.

In order to move the seat from its operative position shown in FIG. 1 into its retracted position shown in FIG. 4, the guardrail is swung upwardly about the axis of the pins 80 from its perpendicular orientation with respect to the back frame over the upper end of said back frame and into engagement with the rear face thereof. The seat is then lifted upwardly to disengage the clip 66 from the frame bight 18 thereby permitting said seat to be folded upwardly into engagement with the front face of the back rest 28. With the seat disengaged from the base frame, the back frame, and thus the seat, can be swung forwardly about the axis of the pins 26 into the collapsed position shown in FIG. 4 in which said seat back and base frames are in generally parallel planes. The car seat can be moved into its extended operative position shown in FIG. 1 by merely reversing the sequence of steps just described.

We claim:

1. A child's automobile seat, comprising a base frame adapted to rest on an automobile seat cushion and having a pair of laterally spaced runners interconnected by an upwardly projecting seat support rigidly associated therewith, a back frame swingly connected to said base frame on a first transverse axis and adapted to rest against an automobile seat back cushion, a backrest mounted on said back frame, a generally U-shaped guard swingably mounted on said back frame on a second transverse axis, a seat swingably mounted on said back frame on a third transverse axis below said second transverse axis and engageable with said seat support for supporting said seat in an operative position, said seat support extending vertically between the base runners and seat when said seat is in its operative position, first means on at least one of said seat and seat support releasably locking said seat and back frame in operative positions in which said back frame is generally perpendicular to said base frame and said seat is generally perpendicular to said back frame, and second means on at least one of said guard and back frame for releasably supporting said guard in an operative position perpendicular to said back frame, said back frame, seat, and guard being swingable about said transverse axes into retracted positions generally parallel with said base frame.

2. The invention as set forth in claim 1 in which said guard comprises a pair of parallel arms swingably connected at one of their ends to said back frame on said second transverse axis and rigidly interconnected at their opposite ends by a transverse bight, said second axis and bight being greater than the distance between said second axis and the upper end of said back frame whereby said guard is swingable into its retracted position to the rear of and generally parallel with said back frame said one ends of said arms are curved upwardly for connection to said second axis, and said second means comprises stop members projecting outwardly from said back frame below said second axis for engagement with said curved one ends for supporting said guard in operative position and a pair of pins on said back frame receivable in recesses in said curved one ends.

3. The invention as set forth in claim 1 in which said base frame comprises a pair of laterally spaced runners connected adjacent their rear ends to said back frame, a pair of rearwardly and upwardly projecting members connected to the forward ends of said runners, and a transverse stretch connected to the upper rearward ends of said members, said members and stretch forming said seat support.

4. The invention as set forth in claim 1 in which said seat support has a transverse stretch engageable with the lower face of said seat, and said first means comprises a clip mounted on the lower face of said seat and receivable over said transverse stretch.

5. The invention as set forth in claim 1 with the addition that a headrest is mounted on said back frame above said backrest, and means for mounting said headrest in vertically spaced positions of adjustment with respect to said backrest.

6. A child's automobile seat, comprising a base, a back frame swingably connected to said base, a guardrail swingably connected to said back frame, a seat adapted to be supported on said base, a pair of pivot means at each side of said back frame swingably interconnecting said seat to said back frame, a first strap having one of its ends connected to said back frame and extending through a first loop carried on one of said pair of pivot means, a buckle mounted on the other end of said first strap, a second loop carried on the other of said pair of pivot means, and a second strap having one of its ends connected to said second loop and its opposite end adjustably receivable in said buckle whereby said straps form a shoulder and seat assembly for retaining a child on said seat, said first and second loops being swingably carried on said pivot means and at least said first loop being removably carried thereon.

UNITED STATES PATENT OFFICE
CERTIFICATE OF CORRECTION

Patent No. 3,583,761  Dated June 8, 1971

Inventor(s) Clayton R. Hume et al.

It is certified that error appears in the above-identified patent and that said Letters Patent are hereby corrected as shown below:

Column 1, line 60, "Such" should read -- Said --. Column 3, line 11, "24" should read -- a --. Column 4, claim 2, starting in line 5 of claim 2, cancel "said second axis and bight being greater than the distance between said second axis and the upper end of said back frame whereby said guard is swingable into its retracted position to the rear of and generally parallel with said back frame".

Signed and sealed this 18th day of January 1972.

(SEAL)
Attest:

EDWARD M. FLETCHER, JR.
Attesting Officer

ROBERT GOTTSCHALK
Acting Commissioner of Patents